United States Patent [19]

Pedigo

[11] Patent Number: 4,995,072
[45] Date of Patent: Feb. 19, 1991

[54] SELF-POWERED BASE AND REMOTE TELEPHONE COMMUNICATION SET

[75] Inventor: Michael K. Pedigo, Indianapolis, Ind.
[73] Assignee: Harold Sandler, Roslyn, N.Y.
[21] Appl. No.: 373,759
[22] Filed: Jun. 30, 1989
[51] Int. Cl.$^5$ ............................................. H04M 11/00
[52] U.S. Cl. ........................................... 379/61; 379/63
[58] Field of Search ................... 379/58, 61, 63, 413, 379/424

[56] References Cited

U.S. PATENT DOCUMENTS

| 3,644,681 | 2/1972 | Rice | 379/61 |
| 4,768,219 | 8/1988 | Yamagata et al. | 379/63 |

FOREIGN PATENT DOCUMENTS

| 3620857 | 12/1987 | Fed. Rep. of Germany | 379/61 |
| 0146505 | 12/1978 | Japan | 379/413 |
| 2187065 | 8/1987 | United Kingdom | 379/58 |

Primary Examiner—Jin F. Ng
Assistant Examiner—Dwayne Bost
Attorney, Agent, or Firm—Darby & Darby

[57] ABSTRACT

A cordless remote telephone unit communicates with a telephone line through a stationary self-powered base unit. The base unit is not plugged into an electrical household receptacle and is therefore completely portable to any location having a telephone jack. The remote unit is portable to any location within the radio range of the base unit. The base unit does not require a household electrical receptacle because non-rechargeable batteries are used in the base and remote units, so there is no need for a battery charger. Moreover, power consumption is minimized when the system is idle by cycling the battery power in both the remote and base units. As communication begins, continuous battery power is provided in place of the cycled power in the base unit in response to receiving from the remote unit a 5 KHz activation tone, a security code and a 22 Hz pilot tone, or in response to a ring received from the telephone line. After communication is established between the two units, the base unit derives reliable power through its hook switch directly from the telephone line using a power regulator suited for the purpose, further reducing power demand on the batteries. Power cycling in the remote unit is replaced by continuous battery power in response to receiving from the base unit a ring tone generated by the base unit ring detector, followed by a security code, or whenever the remote unit hand set is picked up by the user. In one embodiment of the invention, the remote unit handset is connected to a remote unit chassis by a cord, and the remote unit radio receiver and radio transmitter circuits use the cord as their antenna.

22 Claims, 7 Drawing Sheets

SELF-POWERED BASE AND REMOTE TELEPHONE COMMUNICATION SET

BACKGROUND OF THE INVENTION

1. Technical Field

The invention is an improvement in cordless remote telephone systems.

2. Background Art

An ordinary telephone requires relatively little power to operate, and therefore derives sufficient power directly from the telephone line to operate, and need not be plugged into a household power receptacle. Therefore, it is a reliable communication unit, especially during local power outages and is portable to any location having a telephone jack.

Cordless remote telephone systems typically include a base unit connected directly to the user's telephone line and a remote unit with a hand-set, the remote unit and the base unit communicating with each other via a radio link. Typically, the base unit requires 110 volts AC and so must be near a household electrical power receptacle, while the remote unit is powered by rechargeable batteries. The advantage of such a system is that the user may take the remote unit anywhere within the range of the radio link between the two units without having to connect the remote unit to a power source or to the telephone line. The remote unit functions in the same manner as a normal telephone, as far as the user is concerned.

The problem with such a system is that, while the remote unit is independent of other power sources, it cannot function whenever the base unit looses power, because the base unit links the remote unit with the telephone line. Thus, the system cannot be used where household power outlets are unavailable or during a power failure, notwithstanding the independence of the remote unit from other power sources. This places the cordless remote telephone system at a distinct disadvantage relative to ordinary telephones.

This problem appears to be difficult to overcome, particularly because of the power required by each unit during transmission to the other unit. In view of the relatively large amount of power required by the transmitter circuits, the remote unit typically employs rechargeable batteries, a battery charger being provided conveniently in the base unit or other apparatus. Thus, the requirement for a household current source is now two-fold: to provide transmission (as well as receiving) power for the base unit and to provide battery-recharging power through the base unit (or other apparatus) for the remote unit's batteries. Thus, it would not seem possible to provide a practical system in which both the base and remote telephone units are independent of a household power source.

It is therefore an object of the invention to provide a cordless remote telephone system, including a base unit and a remote unit, which is truly independent of other power sources and which is therefore operable at all times and at any location having a telephone line, regardless of the availability of electrical power outlets.

SUMMARY OF THE INVENTION

The invention is a cordless remote telephone system which operates at all times without any need for household electrical power for the base unit. Instead, the invention employs intelligent power cycling and non-rechargeable batteries in both the base and remote units while the system is idle. During operation, the base unit, instead of requiring household current, requires only the power available from the telephone line. The batteries suffice to operate the base unit because a power cycling approach reduces battery drain while the system is idle while the use of non-rechargeable batteries obviates the need for power to run a battery charger previously provided in the base unit or other apparatus. Furthermore, during radio signal reception by either unit, the required power is significantly reduced by employing a local oscillator having a frequency which is only one-third the required frequency, and employing a radio-frequency (RF) tripler at the output of the local oscillator to provide the requisite frequency.

The invention further includes logic circuitry which cycles the power provided by the batteries in both units with an optimum duty cycle for each unit, and intelligently responds to changes in state of both units to switch from cycled power to continuous power in each unit. Power cycling in the remote unit ceases automatically whenever the handset is taken off hook or when a ring is received from the telephone line via an RF link from the base unit. Power cycling in the base unit ceases automatically whenever the remote unit handset is taken off hook if the remote unit transmits a valid security code or whenever a ring is received from the telephone line. While power cycling is restored upon the handset being hung up ("on hook"), in one embodiment of the remote unit of the invention there is a slight delay before power cycling resumes to enable the remote unit to transmit a high frequency tone which ensures that the base unit hangs up the telephone line immediately. Thereafter, the system reaches an equilibrium and the remote unit stops transmitting and is thereafter permitted to switch back to power cycling. Similarly, the same high frequency tone is used temporarily (for a half second) after the remote unit handset is picked up to immediately stop power cycling in the base unit so that the base unit is quickly ready to accept a valid security code and communicate with the remote unit with continuous power. In one embodiment of the invention, the same half second tone postpones the activation of the base unit hook switch to ensure that all is ready before beginning communication over the telephone line.

BRIEF DESCRIPTION OF THE DRAWINGS

Preferred embodiments of the invention are described in detail below by reference to the accompanying drawings, of which.

DETAILED DESCRIPTION OF THE INVENTION

Base Unit Operation

Figure 1A:
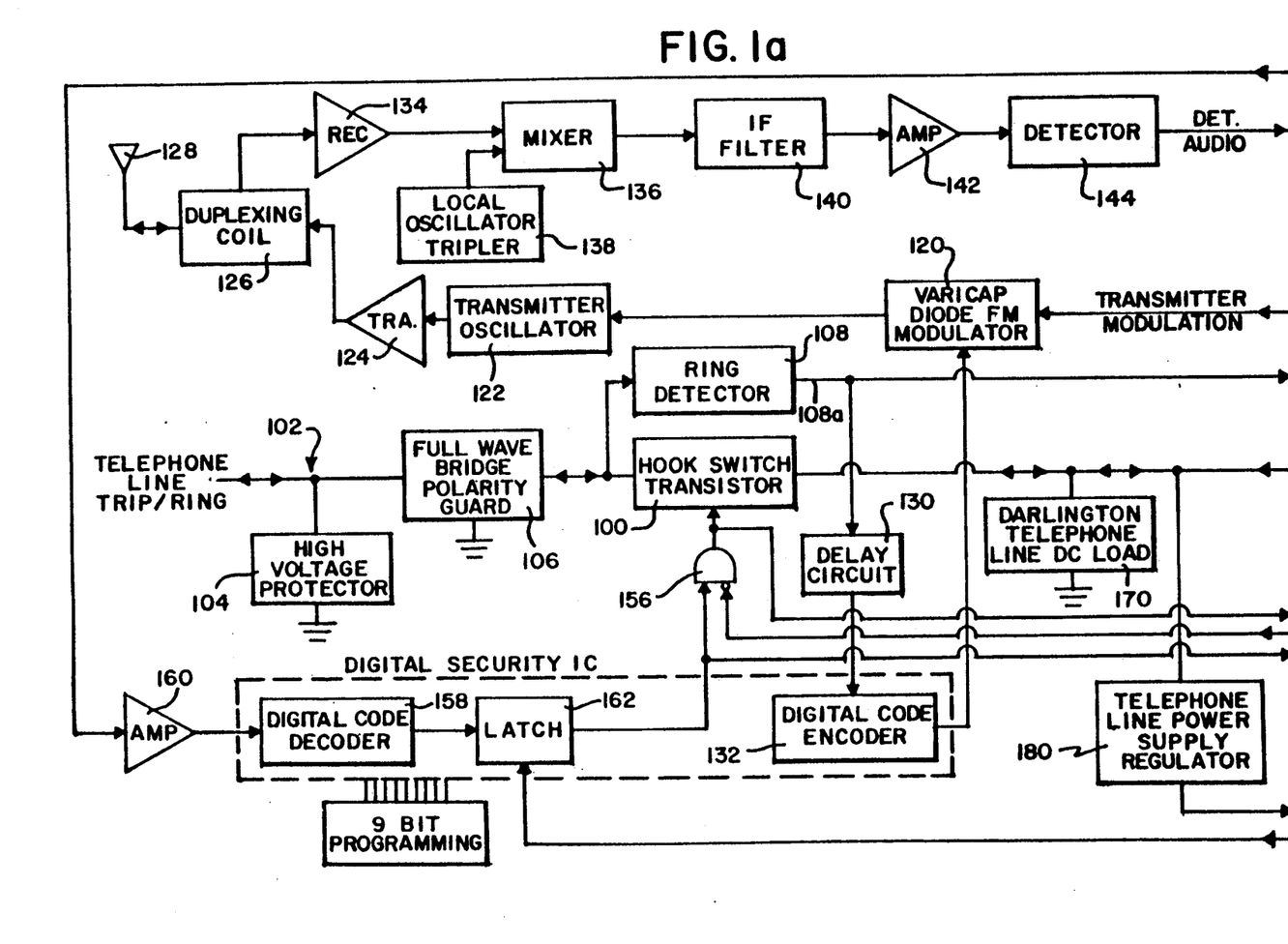
FIGS. 1a and 1b constitute simplified block diagrams of the base unit of the cordless remote telephone system of the invention.
Figure 1B:
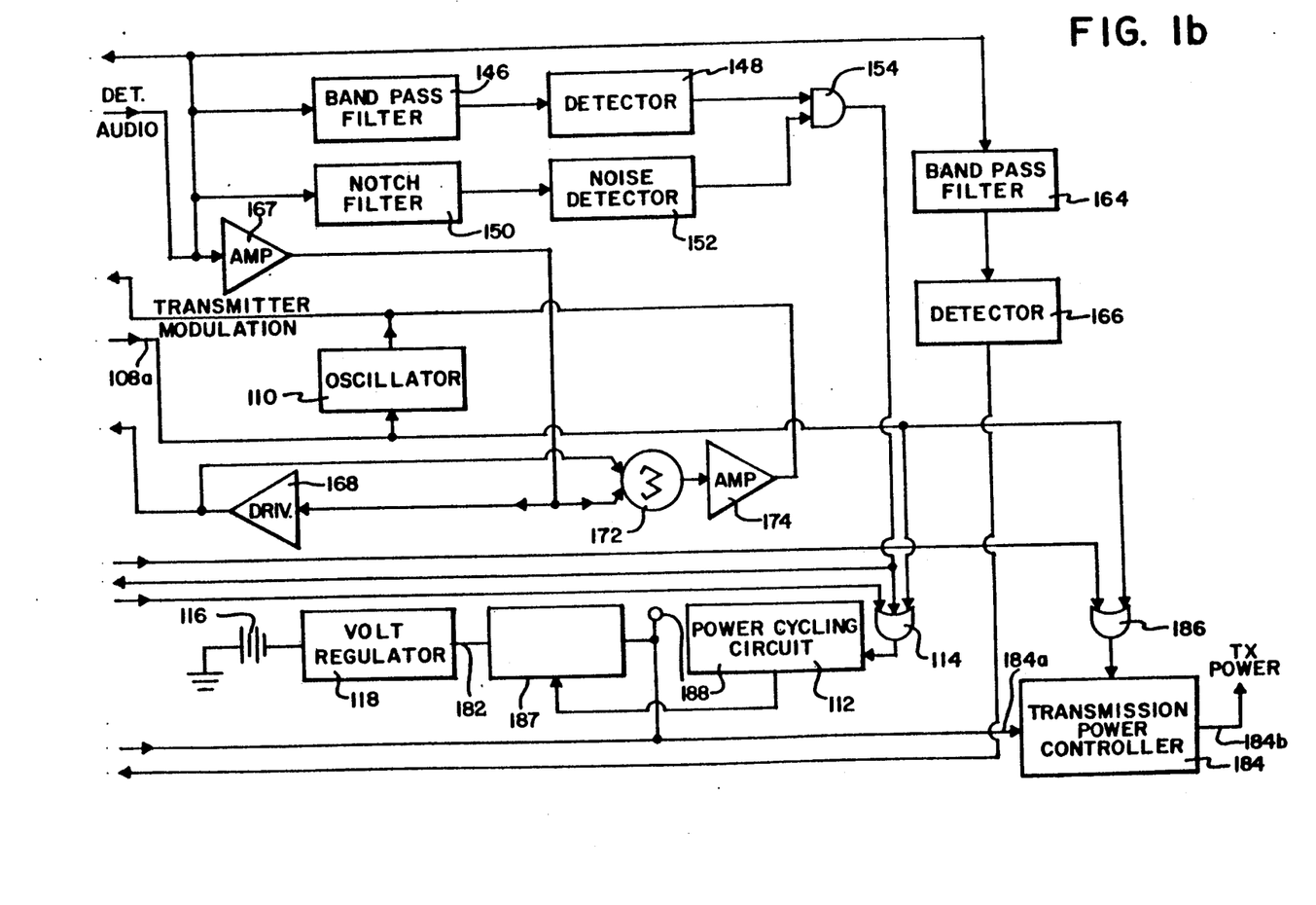

Referring to FIGS. 1a and 1b, the base unit is connected through a hook switch 100 to the user's telephone line at a telephone connector interface 102 having a high voltage protector 104 and a full wave bridge polarity guard 106 of the type well-known in the art. The hook switch is normally off (non-conductive). Whenever a ring signal is received through the telephone interface 102, a ring detector 108 generates a logic "high" at its output 108a which activates a 1300 Hz oscillator 110 and deactivates a power cycling circuit 112 through a logic "OR" gate 114. The power cycling circuit 112 is normally active and periodically permits current to flow from three "C" cell alkaline batteries 116 through a three volt regulator 118 to provide power to the receiver circuits in the base unit illustrated in FIGS. 1a and 1b. It does this once every 300 milliseconds for 30 milliseconds while the unit is not in use, to prolong the life of the batteries 116. However, once deactivated, the power cycling circuit 112 stops cycling so that the power provided at power output node 188 to all of the other base unit circuits changes from cycled to continuous power.

A 1300 Hz tone generated by the oscillator 110 in response to the ring detector 108 is frequency modulated by a variable capacitance diode 120, whose output is modulated with a carrier signal of 46 MHz produced by a transmitter oscillator 122, the resultant signal being transmitted through a radio transmitter output 124 and a duplexing coil 126 to a radio antenna 128. Then, after a one second delay imposed by a delay circuit 130, the logic "high" from the ring detector 108 reaches a digital code encoder of the type well-known in the art. In response, the encoder 132 sends a predetermined binary sequence or security code which is frequency modulated by the variable capacitor diode 120 for transmission from the radio antenna 128.

A remote unit, to be described below, receives all of the signals thus transmitted by the base unit as described above, and produces an audible ring sound. If the user responds by lifting the handset of the remote unit, the remote unit transmits a 5 KHz tone for about a half second, then a predetermined binary sequence or security code and finally a 22 Hz tone, the latter continuing until the remote unit handset is hung up by the user, as will be described below. The purpose for initially transmitting the 5 KHz tone for a half-second is to immediately stop the base power cycling circuit 112 from cycling so as to begin supplying continuous power and to keep the base unit on hook until the base unit is ready to a valid security code and communicate with the external telephone line.

The signals transmitted by the remote unit are received at the base unit antenna 128 and routed through the duplexing coil 126 to a radio frequency receiver amplifier 134. The RF output of the amplifier 134 is mixed by a mixer 136 with an IF signal produced by a local oscillator 138, the mixed signal being filtered in a 455 MHz IF filter 140 and amplified in a limiter amplifier 142. A frequency de-modulating detector coil 144 demodulates the output of the limiter amplifier 142 to produce a detected signal.

The first response of the remote unit, the half-second 5 KHz tone, is detected through a 5 KHz band pass filter 146 by a 5 KHz detector 148. In order to provide noise discrimination, the detected signal is inspected through a 5 KHz notch filter 150 by a noise detector 152 whose inverted output is applied to one input of an "AND" gate 154 whose other input is connected to the 5 KHz detector. The inverted output of the "AND" gate 154 is applied to one input of another "AND" gate 156 controlling the hook switch 100. The second response of the remote unit, namely the binary sequence or security code, is detected at a digital code decoder 158 of the type well-known in the art, through a buffer amplifier and Schmidt trigger 160 connected to receive the detected signal from the FM detector coil 144. If a predetermined binary sequence is received, the digital decoder 158 produces a logic "high" through a latch 162. This logic "high" is applied to the other input of the AND gate 156. Thereafter, the latch is continually held "high" by the third response of the remote unit, namely the 22 Hz pilot tone. The 22 Hz pilot tone is sensed through a 22 Hz band pass filter 164 at a 22 Hz detector 166 from the detected signal produced by the FM detector coil 144. The output of the 22 Hz detector is applied to the latch 162 to hold it in the "high" state.

The AND gate 156 therefore turns on the hook switch 100 (making it conductive) after the termination of the initial half-second 5 KHz tone upon receipt of the valid security code by the decoder 158 and holds the hook switch 100 on as long as the 22 Hz pilot tone is received. Once the hook switch is on, two-way communication is established between the remote unit and the telephone line interface 102. Specifically, the detected signal received from the remote unit is amplified in an audio buffer amplifier 167 and sent through a Darlington telephone line driver 168 across a Darlington telephone line D.C. load 170 of the well-known type through the hook switch 100 to the telephone line interface 102. Similarly, the audio signal received from the telephone line at the interface 102 is sent through the hook switch 100 to a summing point 172, and is thereafter amplified in a modulation amplifier 174 prior to being frequency modulated by the variable capacitance diode 120 for transmission via the antenna 128 to the remote unit.

Intelligent Power Cycling and Control in the Base Unit

The output of the "OR" gate 114 controls the function of the power cycling circuit 112. Specifically, whenever the "OR" gate 114 responds to a logic "high" from either the ring detector 108, the 5 KHz detector 148, the decoder 158 or the 22 Hz detector 166 (through the latch 162), it causes the power cycling circuit 112 to stop cycling and instead to provide continuous power at the power output node 188. This ensures that the base unit is immediately prepared to communicate with the remote unit for the purpose of sending the remote unit a ring signal or for responding in the absence of a ring signal whenever the remote unit handset is lifted off hook by the user (to initiate a call).

A significant feature of the invention is that the batteries 116 are not used after the hook switch 110 is "on", in order to prolong battery life. Specifically, as soon as the hook switch 100 is on, power from the telephone line flows through the interface 102, the hook switch 100 and through a telephone line power supply regulator 180 to a power input node 182 connected to the power cycling circuit 112. The power input node 182 is connected to the outputs of the three volt regulator 118 and the telephone line power supply regulator 180. The telephone line power supply regulator 180 maintains the power node 182 around at least three volts as soon as the hook switch 100 is turned on. This condition is immediately sensed by the three volt regulator 118, which in response stops current flow from the batteries 116, thereby preserving them.

Power supplied to the base unit transmitting circuits—including the modulation amplifier 174, the 1300 Hz oscillator 110, the diode 120, the transmitter oscillator 122 and the radio transmitter output 124—is controlled separately from the power supplied to the receiving circuits— including the RF amplifier 134, the mixer 136, the IF filter 140, the limiter amplifier 142, the FM detector coil 144, the 5 KHz detector 148, the noise detector 152, the 22 Hz detector 166, the audio amplifier 167 and other circuits in the base unit including the ring detector 108, the hook switch 100, the buffer amplifier 160, an integrated circuit embodying the decoder 158 and the encoder 132, and the circuitry embodying the "OR" gate 114. The power output node 188 supplies the power to the latter group of circuits (including the receiver circuits). Power to the transmitting circuits is supplied by a transmission power controller 184 operating independently of the power cycling circuit 112. As understood in this specification, the power supplied to the transmitter and receiver circuits refers to the power required to maintain appropriate bias voltages on the various transistors comprised within each of the transmitter and receiver elements shown in the block diagram. The transmission power controller 184 receives power at its input 184a from the power node 188 and under control of a logic "OR" gate 186 furnishes power from its output 184b to the transmitting circuits mentioned above. Power is continuously provided at the output 184b whenever the "OR" gate provides a logic "high" to the controller 184. One input of the "OR" gate 186 is connected to the output of the ring detector 108 and the other input of the "OR" gate 186 is connected to the output of the hook switch "AND" gate 156. Thus, the "OR" gate 186 activates the transmission power controller 184 whenever the hook switch 100 is turned on or whenever a ring is detected by the ring detector 108. As soon as the hook switch is turned off, the output of the "OR" gate 186 is "low" and the transmission power controller 184 ceases providing power to the transmitter circuits.

Remote Unit Operation

Figure 2A:
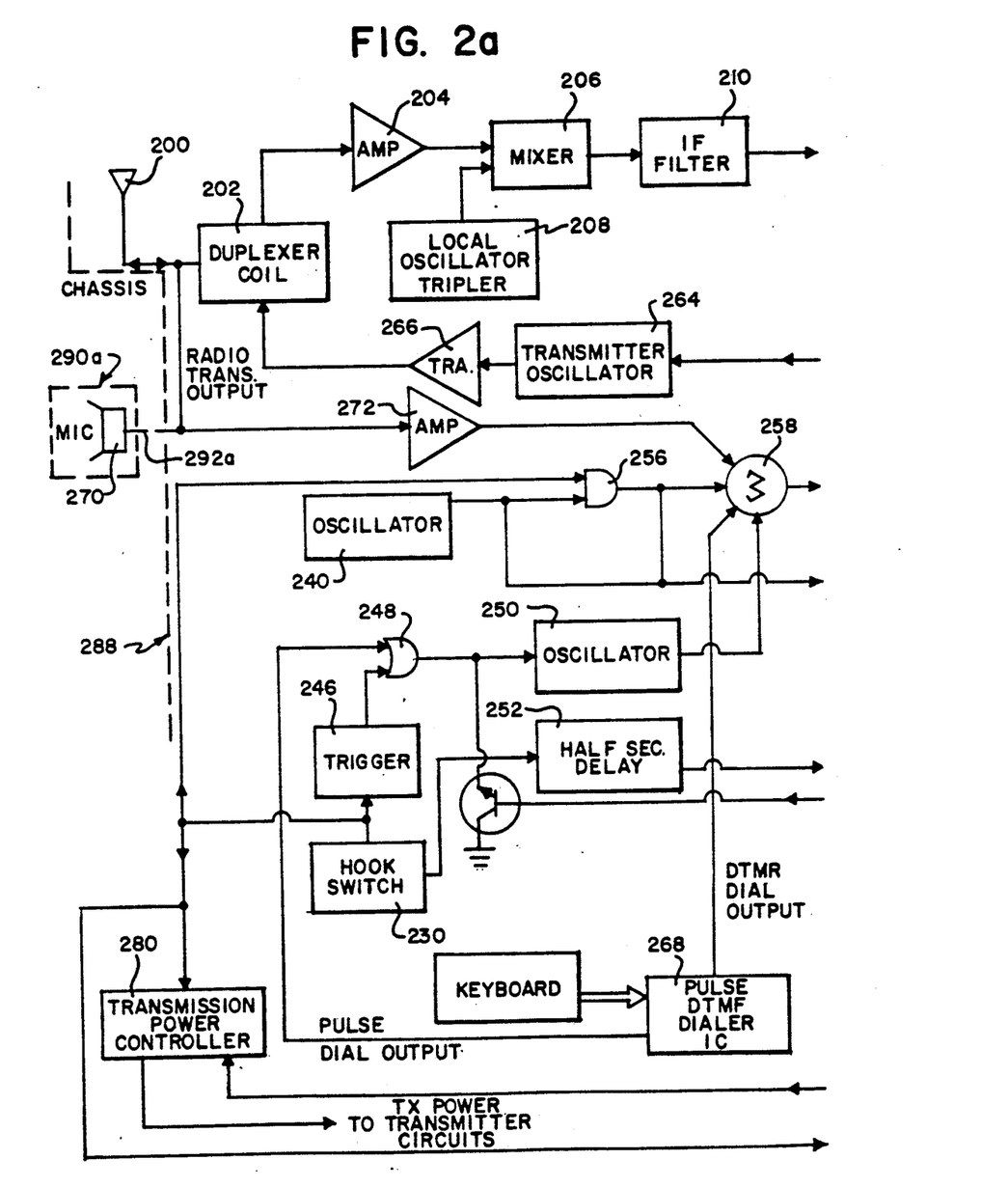
FIGS. 2a and 2b constitute simplified block diagrams of the remote unit of the cordless remote telephone system of the invention.
Figure 2B:
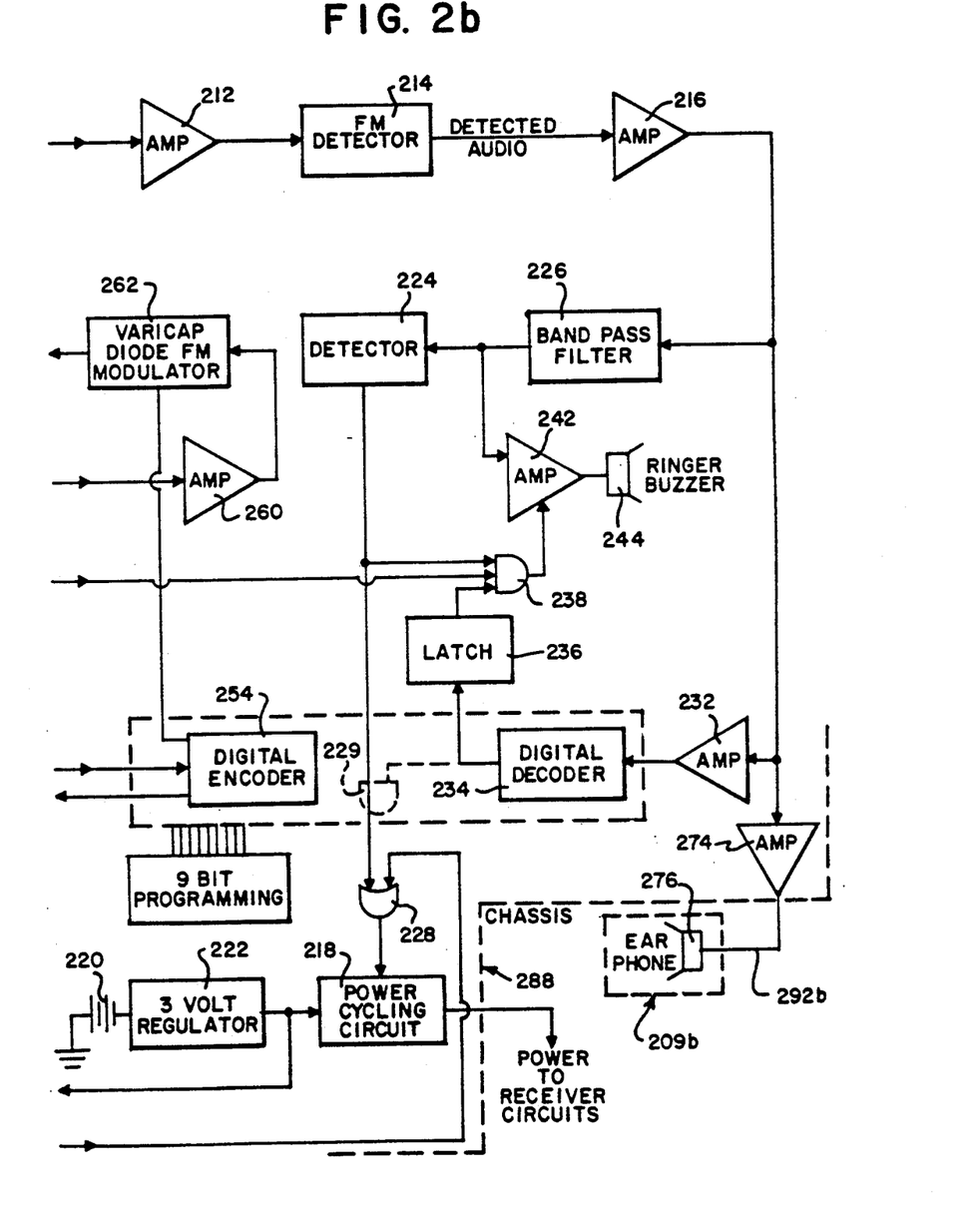

Referring to FIGS. 2a and 2b, the remote unit includes an antenna 200. In one embodiment of the invention, the remote handset is connected to the chassis of the remote unit by a flexible telephone cord, at least one of the conductors in the cord functioning as the remote unit antenna for the remote unit transmitter and receiver circuits, as will be described below. Signals transmitted from the base unit antenna 128 are received at the remote antenna 200 and routed through a duplexer coil 202, amplified by a radio frequency receiver amplifier 204 and mixed by a mixer 206 with an IF signal from a local oscillator 208. The mixed signal is filtered in a 455 MHz IF filter 210, the filtered signal being amplified in a limiter amplifier 212 and then frequency demodulated by an FM detector coil 214 to produce a detected signal which is amplified by an audio buffer amplifier 216. All of the foregoing receiver circuits are powered by a power cycling circuit 218 which receives its power from three "C" alkaline batteries through a three volt regulator 222. In order to conserve battery charge and prolong battery life, when the remote unit of FIG. 2 is idle, the power cycling circuit 218 provides power to the receiver circuits mentioned above just once every 770 milliseconds for a duration of 50 milliseconds each time, power being removed from these circuits so that there is no battery drain at all other times that the system is idle.

If a ring is received from the telephone line at the base unit, the base unit transmits a 1300 Hz tone and a predetermined security code, as described above in connection with FIGS. 1a and 1b. In order for the remote unit to respond to the 1300 Hz tone, a 1300 Hz detector 224 in the remote unit of FIG. 2 is connected through a 1300 Hz band pass filter 226 to receive the detected signal from the audio buffer amplifier 216. In response to the 1300 Hz tone, the detector 224 sends a logic "high" to one input of an "OR" gate 228 controlling the state of the power cycling circuit 218. In response, the "OR" gate 228 applies a logic "high" to the power cycling circuit 218, causing the power cycling circuit 218 to stop cycling and instead to provide continuous power to the receiver circuits of FIGS. 2a and 2b mentioned above. In one embodiment of the invention indicated in dashed line in FIGS. 2a and 2b, the output of the 1300 Hz detector 224 is gated through by the output of the decoder 234 through an OR gate 229 so that either the 1300 Hz tone or the valid security code must be received by the remote unit in order to switch the power cycling circuit 218 to its continuous power mode.

The power cycling circuit 218 is switched from its power cycling mode to the continuous power mode in the same manner whenever the user lifts the handset of the remote unit off hook. This causes a handset on/off hook sensor or hook switch 230, which is normally off, to turn on (become conductive). This event is sensed by the "OR" gate 228 via a connection of its other input to the hook switch 230, so that the "OR" gate 228 switches the power cycling circuit 218 to its continuous power mode in the manner described above in connection with the 1300 Hz detector 224 and the valid security code received by the digital decoder 234.

As mentioned above, the base unit sends a predetermined security code or binary sequence one second after the ring is detected. This code is detected through a buffer amplifier and Schmidt trigger 232 by a digital code decoder 234, which responds by applying a logic "high" through a latch 236 to one input of an "AND" gate 238. Two remaining inputs to the AND gate 238 are connected to the output of the 1300 Hz detector and the output of a 22 Hz oscillator. In order to produce an audible ring signal at the remote unit, the output of the AND gate 238 gates the output of a ringer amplifier 242 whose input receives the output of the 1300 Hz band pass filter. A speaker 244 is connected to the output of the ringer amplifier. Whenever a ring is detected, the ringer amplifier 242 drives the speaker 244 at 1300 Hz interrupted at a 22 Hz rate.

As soon as the remote unit handset is lifted off hook by the user to close the hook switch 230, a trigger 246 detects a change in the state of the hook switch 230 and for the next half-second sends a logic "high" to one input of an "OR" gate 248, which enables a 5 KHz oscillator 250 to begin producing a 5 KHz tone until expiration of the half-second time limit of the trigger 246. Thereafter, a digital code encoder 252, in response to a logic "high" received from the hook switch 230 through a half-second delay 252, generates a predetermined binary sequence or security code. Also, a logic "high" generated by the hook switch 230 when the handset is taken off hook is received at one input of a gate 256 gating the output of the 22 Hz oscillator 240 to a summing node 258. The output of both the 22 Hz oscillator 240 and the 5 KHz oscillator are connected through the summing node 258 to a modulation amplifier 260 whose output in turn is connected to a variable capacitor diode 262. The encoder 254 sends its binary sequence to the variable capacitor diode 262.

Thus, when the remote unit handset is lifted off hook by the user, the variable capacitor diode 262 receives the following sequence of signals: the 5 KHz tone, the security code and the 22 Hz tone. The diode 262 frequency modulates these signals after which they are modulated by a transmitter oscillator 264 and output by a radio transmitter output 266 through the duplexer coil 202 to the remote unit antenna 200. At this point, two way communication is established between the base and remote units. Specifically, the remote unit can transmit tone dial signals from a dialing circuit 268 or audio signals from a microphone and amplifier 270, 272 sent to the summing node 258. Alternatively, pulse dialing may be accomplished by applying the pulse dialing output of the dialing circuit 268 to the other input of the OR gate 248 so that the 5 KHz oscillator provides the pulse dial signal to the summing node 258. Also, the remote unit can receive voice signals which are amplified in the buffer amplifier 216 and in an audio amplifier to drive the earphone speaker 276 in the remote unit handset.

As soon as the user hangs up the remote unit handset, the trigger 246 again senses a change in the state of the hook switch 230 and, for four seconds, applies a logic "high" to the input of the OR gate 248. As a result, the remote unit transmits a 5 KHz tone to the base unit. Meanwhile, the hook switch 230, being "hung up", now applies a logic "low" to the AND gate 256, thus cutting off transmission of the 22 Hz pilot tone from the remote to the base unit. The purpose in sending the four second 5 KHz tone when the remote is hung up is to cause the base unit to go off hook instantly by means of the response of the base unit AND gate 156 to the 5 KHz tone. Without this feature, the base unit is relatively slow to hang up, since it responds slowly to the removal of the low frequency (22 Hz) pilot tone. In accordance with one feature of the invention, the hand set cord is used as an antenna for the receiver and transmitter circuits of the remote unit of FIGS. 2a and 2b. Specifically, the remote unit circuits are contained in a chassis 288 shown in FIGS. 2a and 2b by dashed lines. The microphone 270 and speaker 276 are housed in a handset 290a,b. At least one of the conductors 292a and 292b connecting the microphone 270 and speaker 276 to the remote transmitter and receiver circuits respectively is connected to the antenna side of the duplexer coil 202.

Intelligent Power Cycling and Control in the Remote Unit

As mentioned previously in connection with FIG. 2, the power cycling circuit 218 provides power from the batteries 220 in 50 millisecond bursts every 700 milliseconds when the system is idle and provides continuous power in response to a logic "high" from the OR gate 228. The OR gate in turn generates a logic "high" whenever either the 1300 HZ detector 224 senses the 1300 Hz ring tone (with a valid security code) or the handset is off hook.

The remote unit of FIGS. 2a and 2b controls power to the receiver and transmitter circuits separately. The output of the power cycling circuit 218 provides power to the receiver circuits, which include the amplifier 204, the mixer 206, the amplifier 212, the amplifier 216, the amplifier 274, the 1300 Hz detector 224 and related circuits. The output of a transmission power controller 280 provides the power to the transmitter circuits, which include the oscillators 240 and 250, the modulation amplifier 260, the variable capacitor diode 262, the transmitter oscillator 264 and the radio transmitter output 266. Like the power cycling circuit 218, the transmission power controller 280 receives its power from the three volt regulator 222. The controller 280 applies this power to the transmitter circuits mentioned above in response to the state of the hook switch 230. Whenever the hook switch 230 is conductive, the transmission power controller 280 applies power to the transmitter circuits. Otherwise, it applies no power to them, in order to prevent unnecessary battery drain when the system is idle.

Transmission Power Controller

Figure 3:
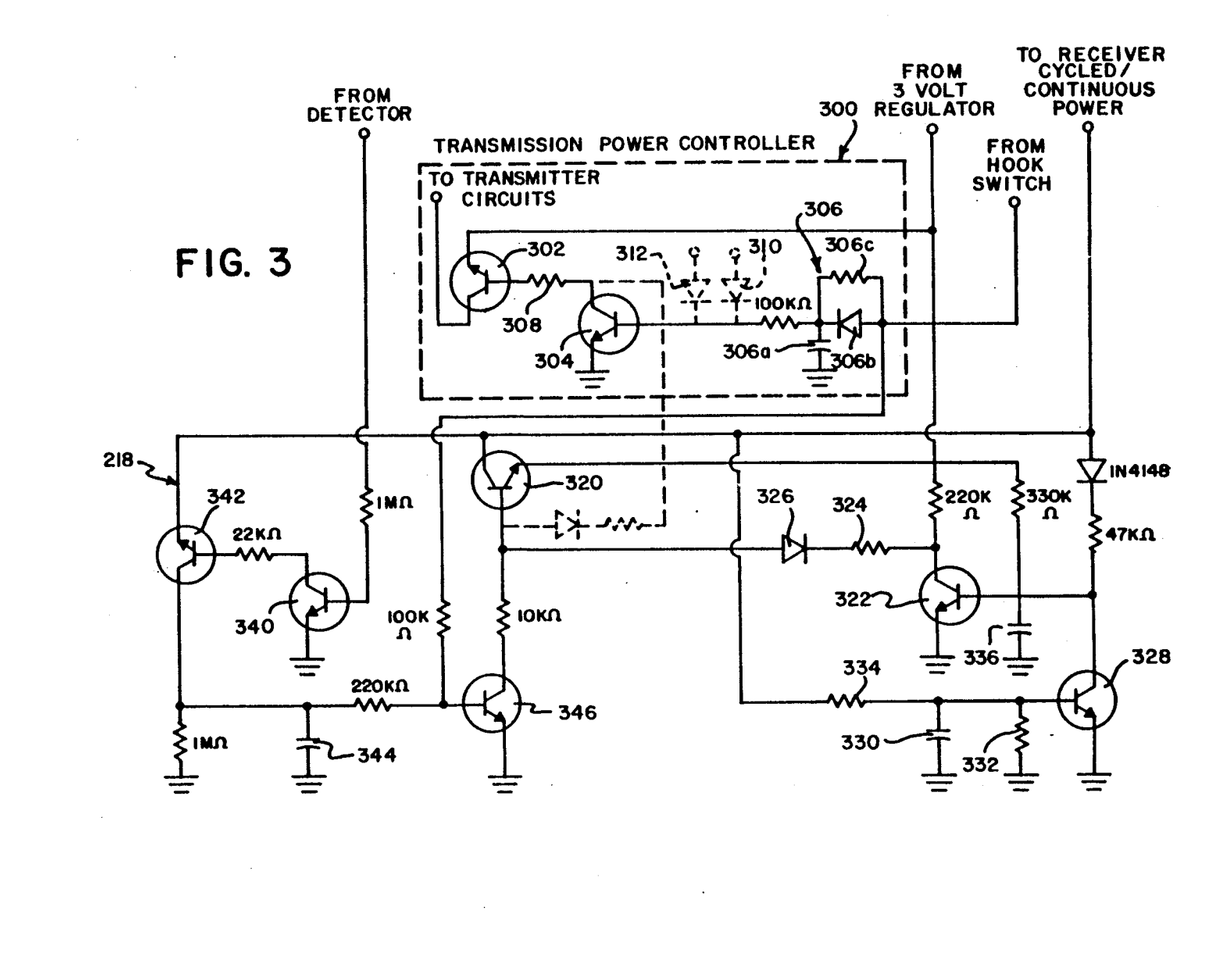
FIG. 3 is a schematic diagram of the power cycling circuit and transmission power controller employed in one embodiment of the remote unit of FIGS. 2a and 2b.

Referring to FIG. 3 a transmission power controller 300 is illustrated schematically. The controller 300 is particularly suitable for use as the remote unit transmission power controller 280 of FIG. 2a. Power from the three volt regulator 222 is applied to the emitter of a transistor 302 whose collector is the power output of the transmission power controller 300. The output of the hook switch 230 controls the base voltage of a transistor 304 through a holding circuit 306. As soon as the hook switch is "on", the base voltage of the transistor 304 increases so as to turn on the transistor 304. This discharges the voltage on the base of the transistor 302 through a resistor 308 connected to the collector of the transistor 304, in order to turn on the transistor 302, providing a direct connection between the three volt regulator 22 and the transmitter circuits.

Meanwhile, the current from the hook switch charges a capacitor 306a in the hold circuit 306. As soon as the hook switch 230 turns off, a diode 306b prevents the capacitor 306 from discharging directly back through the hook switch 230, the discharge occurring gradually through a resistor 306c. In the meantime, the base voltage of the transistor 304 is maintained after the hook switch 230 is turned off until the capacitor 306a is finally discharged. This maintains power to the remote unit transmitter circuits after the handset is hung up (on hook) to give remote unit the opportunity to transmit the four second 5 KHz tone to instantly hang up the remote unit, as discussed above.

The base unit transmission power controller 184, while separate and independent, is similar to the remote unit transmission power controller 280, except that the hold circuit 306 is not required in the base unit. Moreover, in the base unit transmission poWer controller 184 the input from the base unit hook switch 100 is augmented by another input from the base unit ring detector 108. The OR gate 186 of FIG. 1b may be implemented as a diode OR gate in the manner suggested in dashed line in FIG. 3 by connecting the hook switch 230 through a diode 310 and connecting the ring detec-

Remote Unit Power Cycling Circuit

FIG. 3 also illustrates one embodiment of the remote unit power cycling circuit 218. Power from the three volt regulator 222 is applied to the emitter of an output transistor 320 while the receiver circuits receive their power from the collector of the transistor 320. The transistor 320 is on so as to apply power to the receiver circuits whenever a switching transistor 322 is on, connecting the base of the transistor 320 to ground through a resistor 324 and a diode 326. This condition in turn raises the voltage on the base of a regulating transistor 328 so as to turn it on after a delay determined by the capacitance of a capacitor 330 and the resistance of resistors 332 and 334. As soon as the transistor 328 is turned on, it decreases the voltage on the base of the transistor 322 so as to turn it off after a time delay determined by the capacitance of a capacitor 336. This in turn raises the voltage on the base of the transistor 320 so that it is turned off to remove power from the output of the controller 218. This condition removes the voltage on the base of the transistor 328 so as to turn it off after a delay determined by the capacitor 330. As a result, the capacitor 336 is allowed to charge up so as to raise the base voltage on the transistor 322 and turn it on after a corresponding delay. This returns the circuit to its original condition so that the foregoing cycle may repeat itself. The component values indicated in drawing of FIG. 3 were selected in order to provide duty cycle by the transistor 320 of 800 milliseconds "off" and 50 milliseconds "on".

In order to stop power cycling and provide continuous power in the event of a "ring" being received, the output of the 1300 Hz detector 224 is connected to the base of a transistor 340 whose emitter is connected to ground. In one embodiment of the invention, the output of the 1300 Hz detector is connected to the base of the transistor 340 through the OR gate 229 of FIG. 2b. Receipt of a 1300 Hz tone turns on the transistor 340 which pulls down the base voltage of a transistor 342, turning the latter on. This in turn charges a capacitor 344 while turning on a transistor 346. As soon as the transistor 346 is turned on, it pulls down the base voltage on the transistor 320, holding on the transistor 320. This stops the power cycling and provides continuous power through the transistor 320. Preferably, the capacitance of the capacitor 344 is such that it holds the base of the transistor 346 high between rings so that power is not interrupted during ringing. The drawing of FIG. 3 indicates a capacitance value corresponding to a hold time of about 8 seconds.

In order to stop power cycling in response to the handset being taken off hook, the remote unit hook switch 230 is connected to the base of the transistor 346, which responds to the hook switch 230 being turned "on" to stop the cycling of the transistor 320 so as to provide continuous power.

Base Unit Power Cycling Circuit

Figure 4:
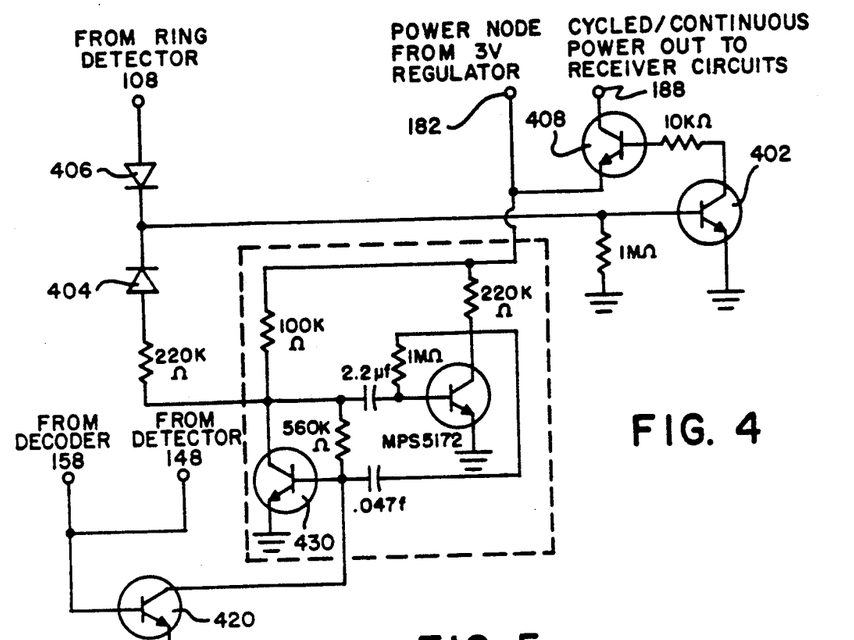
FIG. 4 is a schematic diagram of the power cycling circuit employed in one embodiment of the base unit of FIGS. 1a and 1b.

Referring to FIG. 4, the base unit power cycling circuit 112 includes a bi-stable multivibrator circuit 400 having a cyclic "low" time of 700 milliseconds and a cyclic "high" time of 50 milliseconds at its output 400a. The multivibrator output 400a controls the base voltage of a transistor 402 through a first diode 404, while the ring detector 108 controls the base voltage through a second diode 406, the two diodes providing a diode OR gate. When either the ring detector 108 or the multivibrator 400 provides a "high", the transistor 402 turns on. This pulls down the base voltage of a transistor 408 and turns on the transistor 408 to complete the connection between the power node 182 and the power output node 188. Power cycling is thus interrupted so that continuous power is provides whenever a ring is received.

In order to interrupt power cycling in response to receipt of a 5 KHz tone or a valid security code, the outputs of the decoder 158 and the 5 KHz detector 148 are connected to the base of a transistor 420 whose emitter is connected to ground. Whenever the decoder 158 or the 5 KHz detector 148 turn on the transistor 420, the base voltage of the output transistor 430 in the multivibrator 400 is pulled down, holding the multivibrator output 400a high so as to temporarily interrupt cycling by the multivibrator 400.

Reduction of Power Consumption

While the digital encoder/decoder circuits 132, 158 in the base unit and 254, 234 in the remote unit as well as the dialing circuit 268 in the remote unit are all CMOS integrated circuits, the remaining components are preferably discrete. This permits each transistor to be individually biased for optimum efficiency and minimum power consumption. Because more power is consumed during transmission, a special effort was made to reduce the power consumed by the radio receiver circuits in both the remote and base units. Specifically, as illustrated in FIG. 1, the switching frequency of local oscillator was reduced from the required frequency (49 MHz) by a factor of three to achieve a proportionate power savings by using a frequency tripler 138a at the output of a 16 MHz oscillator 138b. Preferably, the mixer 136 is of the cascaded variety.

Base Unit Telephone Line Power Supply Regulator

Figure 5:
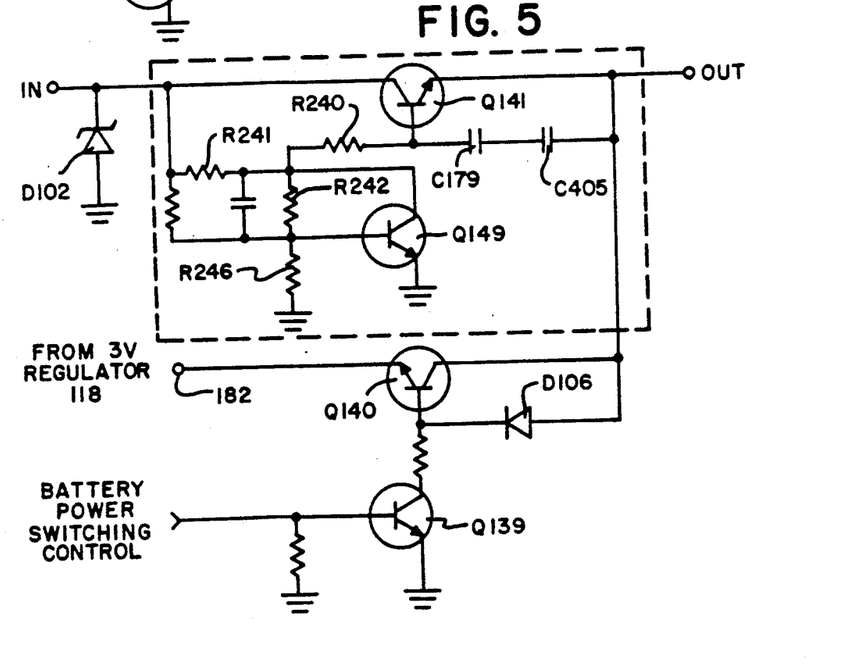
FIG. 5 is a schematic diagram of an exemplary telephone power supply regulator employed in the base unit of FIGS. 1a and 1b.

Referring to FIG. 5, the base unit's telephone line power supply regulator 180 includes an emitter follower regulator transistor Q141 which receives the rectified telephone line current at its collector and produces therefrom a regulated voltage at its emitter. The voltage from the telephone line at the collector of Q141 can vary anywhere between 4.5 and 16 volts, depending upon the distance to the telephone company central switching equipment. The current may vary between 20 mA and 100 mA. The emitter voltage of Q141 is regulated by the action of another transistor Q149. If the telephone line voltage at the emitter of Q141 is about 16 volts, then the collector voltage on the transistor Q149 is held between about 3.6 and 3.8 volts with respect to ground, as determined by the values of the resistors R242 and R246 on the collector and emitter, respectively, of Q149. At the same time, the base to emitter voltage of Q149 is about 0.6 or 0.7 volts, which is determined by the value of a feedback resistor R241. The approximate collector to base voltage of Q149 is a multiple of its base to emitter voltage in accordance with the ratio of the resistances of the resistors R242 and R246. The collector to base voltage of Q149 is regulated at about 3.6 volts, which maintains the base voltage of Q141 at nearly the same voltage through a resistor R240. Because Q141 acts as an emitter follower transistor, its emitter voltage is typically about 0.6 volts below its base voltage, so that the output voltage of the regulator 180 is about 3 volts. The regulator circuit of Q141 and Q149 is not perfectly stable and will follow variations in the telephone line voltage. Specifically, as the telephone line voltage varies from 4.5 volts to 16 volts, the emitter voltage of Q141 varies from 3 volts to 3.5 volts. However, such a variance is well within the required tolerances.

One problem in drawing current from the telephone line to power the transmitter circuits of the base unit is that the required transmission power varies significantly with variations in the amplitude of the audio signal being transmitted. Such variations may be reflected back to the telephone line as variations in current draw, a significant disadvantage. Accordingly, in the invention a pair of electrolytic capacitors C179 and C405 connected back to back (so as to be unpolarized) are connected between the base and emitter of the regulator transistor Q141. These capacitors absorb most current variations caused by variations in the power drawn by the transmitter (or other) circuits in the base unit, preventing such variations from being reflected back into the telephone line.

The emitter of Q141 is connected to the output of the regulator 180 through a switching transistor Q140. The switching transistor Q140 functions as the battery power switch 187 illustrated in FIG. 1b. A diode D106 is connected between the collector and the base of Q140. The collector of Q140 is the output of the battery power switch 187 of FIG. 1b and receives the emitter current of Q141. The emitter of Q140 is connected at the node 182 to the output of the three volt regulator 118, as shown in FIG. 1b. This maintains the emitter voltage of Q140 at 3 volts, so that if the voltage furnished from Q141 to the collector of Q140 is at least 3 volts or greater, the diode D106 becomes forward biased and turns off the switching transistor Q140. Thus, the regulator output is maintained at 3 volts.

Over-voltage protection is provided by an 18 volt Zener diode 502 connected between the collector of Q141 and ground.

Three Volt Regulator

Figure 6:
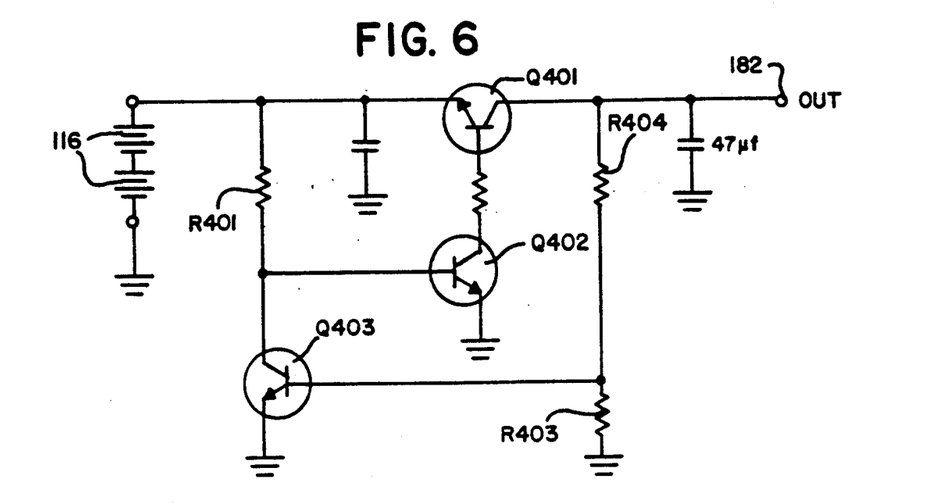
FIG. 6 is a schematic diagram of an exemplary three volt regulator employed in the base and remote units.

Referring to FIG. 6, the three volt regulator 118 of FIG. 1, which is equivalent to the three volt regulator 222 of FIG. 2, includes a pass transistor Q401 whose emitter is connected to the batteries 116 and whose collector is the three volt regulator output connected to the node 182 shown in FIG. 1b. Whenever the collector voltage of Q401 exceeds the regulated voltage, Q401 turns off. The base voltage of Q401 is controlled by a feedback transistor Q402. The base voltage of the feedback transistor is controlled by a regulation transistor Q403. The base voltage of the regulation transistor Q403 responds to the collector voltage of Q401 through a feedback resistor divider pair R404 and R403. Typically, the circuit sets itself up so that the base voltage of the regulator transistor is about 0.6 volts while the collector voltage of the pass transistor Q401 is about three volts. If for example the collector voltage of Q401 exceeds a certain threshold, then the base of Q403 is overdriven, which reduces the Q403 collector voltage and the Q402 base voltage. This begins to turn off Q402, increasing the voltage on the base of the pass transistor Q401, so as to reduce the voltage at the collector of Q401, until this voltage no longer exceeds the desired threshold (three volts). On the other hand, if the Q401 collector voltage is below the desired threshold, the Q403 base voltage decreases to begin to turn off Q403, increasing the base voltage of Q402 so as to draw more current out of the base of Q40 until either Q401 is saturated or the output voltage at the Q401 collector is brought back up to the desired threshold level of three volts.

The advantage of the transistorized regulator circuit of FIG. 6 over typical regulator circuits which rely on Zener diodes is that Zener diodes typically do not provide accurate voltage regulation below about 5 volts, whereas the regulation transistor Q403 does so provide. Moreover, such discrete transistors are currently less costly than Zener diodes.

Remote Unit Hook Switch Trigger

Figure 7A:
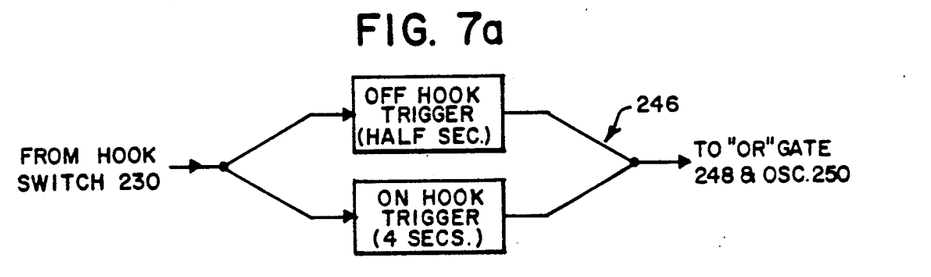
FIGS. 7a and 7b are block and schematic diagrams, respectively, illustrating one exemplary implementation of the remote unit hook switch trigger.

FIG. 7a is a simplified block diagram illustrating the function of the trigger 246 of FIG. 2 connected between the hook switch 230 and the OR gate 248 controlling the 5 KHz oscillator. As previously mentioned herein, the trigger 246 provides two functions. First, it is an "off hook" trigger which sends a logic "high" to the OR gate 248 for a half second whenever the remote unit handset is first taken off hook (whenever the hook switch 230 output goes from low to high). Secondly, it is an "on hook" trigger which provides a logic "high" for four seconds whenever the remote unit handset is hung up on hook (whenever the hook switch 230 output goes from high to low). As described previously in connection with FIGS. 1a, 1b and 2a, 2b, the purpose of the "off hook" trigger function is to send a half-second 5 KHz tone burst from the remote to the base unit, which is sensed by the OR gate 114 to immediately stop power cycling in the base unit whenever the remote handset is picked up by the user. The purpose of the "on hook" trigger function is to send a 4 second 5 KHz tone burst from the remote to the base unit, which is sensed by the AND gate 156 to immediately turn off (hang up) the base unit hook switch 100 whenever the remote unit hand set is hung up back on hook by the user.

Figure 7B:
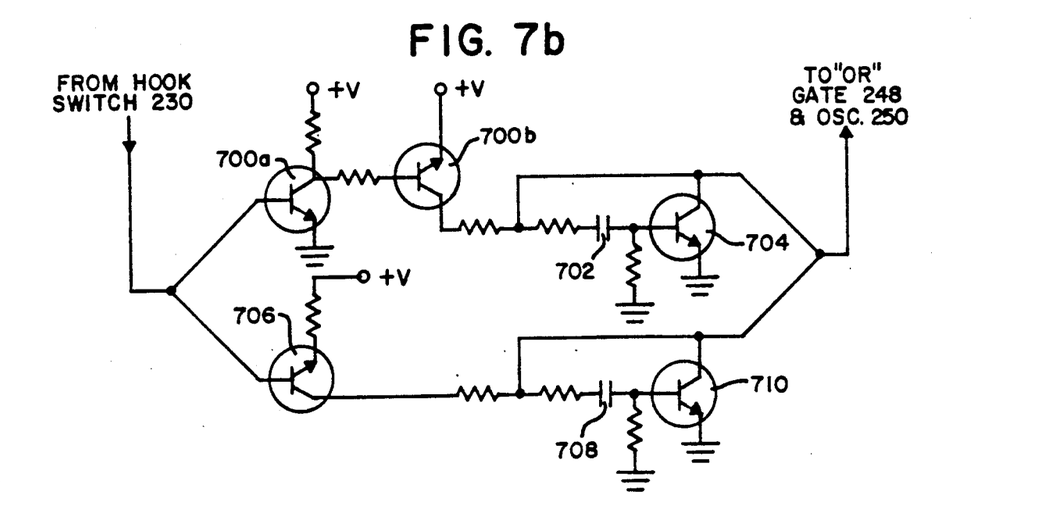

While the implementation of these two trigger functions does not affect the concept of the invention, a highly simplified example of one possible implementation is illustrated in schematic form in FIG. 7b. The "off hook" trigger includes an NPN pass transistor 700 whose base is connected to the output of the hook switch 230 and whose collector is connected to the OR gate 248. Whenever the hook switch 230 provides a "high" to the base of the transistor 700a, the collector of the transistor 700b provides a "high" to the OR gate 248. At the same time, a capacitor 702 begins to charge up until, after a delay of a half-second, the base voltage of an NPN cut-off transistor 704 is sufficiently high to turn on the cut-off transistor 704. As soon as the cut-off transistor 704 is turned on, it pulls down the voltage applied to the OR gate 248 to create a logic "low".

The "on hook" trigger is the same except that its pass transistor 706 is a PNP instead of an NPN transistor, so that it turns on when the hook switch provides a "low" to its base. This generates a "high" at the collector of the pass transistor 706 applied to the OR gate 248. At the same time a capacitor 708 begins to charge up from the collector current of the pass transistor 706. The value of the capacitor 708 is chosen so that after 4 seconds its voltage is sufficient to turn on a cut-off transistor 710. This removes the "high" from the OR gate 248, and the trigger returns to its normal "low" state.

While the invention has been described in detail with specific reference to preferred embodiments thereof, it is understood that variations and modifications may be made without departing from the spirit and scope of the invention.

What is claimed is:

1. A cordless remote telephone system including a base unit and remote unit in radio communication with said base unit, said remote unit having a handset which is normally on hook, said base unit having a ring detector and a hook switch connectable to a telephone line, said base and remote units each comprising respective radio transmitter modulator circuits and respective radio receiver circuits, said system comprising:

telephone line power supply means in said base unit for furnishing power from said telephone line to an output node whenever said hook switch is closed;

base power cycling means in said base unit for periodically providing power for limited durations to the receiver circuits in said base unit, said base power cycling means comprising:
   (a) battery means,
   (b) voltage regulator means connected to said output node for regulating the voltage supplied by said battery means,
   (c) battery power switching means for turning off power supplied from said battery means whenever said telephone line power supply means begins furnishing power from said telephone line,
   (d) receiver power switching means for periodically connecting said output node to said base unit radio receiver circuits;

remote signaling means in said remote unit for sending activation signals to said base unit whenever said handset is taken off hook; and base control means in said base unit responsive to said ring detector and to said activation signals from said remote unit for interrupting said receiver power switching means so that said base unit power cycling means stops cycling and instead provides continuous power, and responsive to said activation signals for closing said hook switch, whereby said power cycling means provide continuous power from said battery means until said telephone line power supply means begins supplying telephone line power from said hook switch.

2. The cordless remote telephone system of claim 1 wherein said telephone line power supply means comprise a switching transfer whose collector is connected through said hook switch to said telephone line and whose emitter is connected to the output of said telephone line power supply means, said telephone line power supply means further comprising capacitor means connected between said base and said emitter of said switching transistor for absorbing current fluctuations in said base unit transmitter circuits so as to prevent said fluctuations from being reflected back to said telephone line.

3. The cordless remote telephone system of claim 1 wherein said battery means are non-rechargeable.

4. The cordless remote system of claim 1 wherein said remote unit further comprises:
   a remote chassis containing said remote unit receiver and transmitter circuits, wherein said remote unit handset comprises a microphone and speaker;
   a hand set cord connected said handset speaker and microphone with said remote unit receiver and transmitter circuits; and
   radio frequency output and input means in said remote unit transmitter and receiver circuits connected to said handset cord, whereby said handset cord functions as an antenna for said remote unit transmitter and receiver circuits as well as being the connection for said microphone and speaker with said circuits.

5. The cordless remote telephone system of claim 1 further comprising base transmission power control means in said base unit responsive to said ring detector and to said hook switch for continuously applying power from said output node to the transmitter circuits in said base unit (a) whenever said hook switch is conductive and (b) for at least a limited time whenever said ring detector detects a ring signal from said telephone line and otherwise stopping the flow of power from said output node to said base unit transmitter circuits.

6. The cordless remote telephone system of claim 5 wherein said remote signaling means comprise encoder means connected to said remote unit transmitter modulator circuits for generating a predetermined code in response to said handset being taken off hook, whereby said code comprises one of said activation signals, and wherein said base control means comprise decoder means connected to said base unit receiver circuits and responsive only to said predetermined code for closing said hook switch.

7. The cordless remote telephone system of claim 6 wherein said transmission power controller is activated to provide power whenever said decoder senses said predetermined code.

8. The cordless remote telephone system of claim 1 wherein said signaling means in said remote unit is responsive to said handset being placed on hook for sending a deactivation signal to said base unit and wherein said control means in said base unit is responsive to said deactivation signal for immediately opening said hook switch.

9. The cordless remote telephone system of claim 8 wherein said remote unit signaling means comprises means connected to the transmitter modulator circuits of said remote unit for generating a high audio frequency tone, off hook trigger means for enabling said high audio frequency tone generating means for a first duration whenever said remote unit handset is taken off hook and on hook trigger means for enabling said high audio frequency tone generating means for a second duration whenever said remote unit handset is placed on hook.

10. The cordless remote telephone system of claim 9 wherein said switching means of said base power cycling means comprises a bi-stable multivibrator and means for interrupting the operation of said multivibrator, and wherein said base control means comprise high frequency tone detector means connected to the receiving circuits of said base unit and responsive to the tone generated by said high audio frequency tone generating means, said means for interrupting said multivibrator being connected to said ring detector and to said high audio frequency tone detector means.

11. The cordless remote telephone system of claim 9 wherein said remote signal generating means further comprises a low frequency pilot tone generator coupled to said remote transmitter modulator circuits and wherein said base control means further comprises means responsive to a low frequency pilot tone and connected to said means for interrupting said base unit switching means, whereby said pilot tone maintains said base and remote units in two-way communication in the absence of other activation signals.

12. The cordless remote telephone system of claim 8 further comprising remote power cycling means in said remote unit for periodically provided power for limited durations at a remote output node to the radio receiver circuits of said remote unit, said remote power cycling means comprising:
 (a) remote battery means,
 (b) remote voltage regulator means connected to said remote output node for regulating the voltage supplied by said remote battery means, and
 (c) remote switching means for periodically connecting said output node to said remote unit radio receiver circuits.

13. The cordless remote telephone system of claim 12 further comprising remote transmission power control means in said remote unit responsive to the activation signals from said base unit signaling means and further responsive to the remote unit handset being taken off hook for continuously applying power from said remote output node to the transmitter circuits of said remote unit whenever said handset is taken off hook and whenever said base unit signaling means transmits said activation signal, and otherwise stopping power from flowing to said remote unit transmitter circuits from said remote output node.

14. The cordless remote telephone system of claim 13 further comprising means for delaying the stopping of said power by said remote transmission power control means so as to permit said remote transmitter circuits to transmit said deactivation signal to said base unit after said remote unit handset is placed on hook.

15. The cordless remote telephone system of claim 12 further comprising:
 base signaling means in said base unit responsive to said ring detector for sending activation signals to said remote unit; and
 remote control means in said remote unit responsive to said activation signals of said base signaling means and to said handset being taken off hook for interrupting said remote unit switching means so that said remote unit power cycling means continuously provides power to said remote unit receiver circuits.

16. The cordless remote telephone system of claim 15 wherein said remote switching means comprise a battery power switching circuit characterized by a short on time and a longer off time duty cycle, said battery power switching circuit including a switching output transistor, and wherein said remote control means comprises means for holding said switching output transistor in one state, said means for holding including resistor-capacitor time constant means responsive to the activation signal generated by said ring detector for imposing a minimum time during which said interrupting means operates, said minimum time corresponding to a standard time between rings on said telephone line.

17. A portable telephone system including a base unit having radio receiver and radio transmitter circuits, a hook switch for connecting said base unit with a telephone line and a ring detector connected to said telephone line, said system further including a remote unit having its own radio receiver and radio transmitter circuits, a handset and a handset on/off hook sensor, said system comprising:
 telephone line power means in said base unit for conducting power from said telephone line through said hook switch to said base unit circuits whenever said hook switch is closed;
 base unit battery and regulator means for supplying power to said base unit circuits whenever said hook switch is open;
 base unit power cycling means in said base unit characterized by an on/off duty cycle for periodically interrupting power flow from said base battery means;
 base control means in said base unit connected to said base radio receiver circuits and to said ring detector and responsive to an activation tone, a pilot tone and said ring detector for opening said hook switch in response to said activation tone, maintaining said hook switch closed in response to said pilot tone and stopping said base unit power cycling means so that said base battery and regulator means furnishes uninterrupted power to said base circuits in response to any one of said activation tone, said pilot tone and said ring detector; and
 remote control means in said remote unit connected to said handset on/off hook sensor and to said remote unit radio transmitter circuits for generating both (a) said activation tone for a limited time and (b) said pilot tone in response to said handset being off hook, and in response to said handset being placed back on hook, for generating said activation tone for a limited time and stopping said pilot tone.

18. The portable telephone system of claim 17 further comprising:
 a ring tone generator connected to said base unit ring detector and to said base unit transmitter circuits for generating a ring tone in response to a ring detected by said ring detector;
 remote battery and regulator means in said remote unit for supplying power to said remote unit circuits;
 remote power cycling means in said remote unit for periodically interrupting power from said remote battery means; and
 remote cycling control means, connected to said remote unit radio receiver circuits, said remote handset on/off hook sensor and said remote power cycling means, for sensing either said ring tone or said handset being off hook, and in response stopping said remote power cycling means so that said remote battery means furnishes uninterrupted power to said remote unit circuits.

19. The portable telephone system of claim 17 wherein said battery means are non-rechargeable.

20. A portable telephone system including a base unit having radio receiver and radio transmitter circuits, a hook switch for connecting said base unit with a telephone line and a ring detector connected to said telephone line, said system further including a remote unit having its own radio receiver and radio transmitter circuits, a handset and a handset on/off hook sensor, said system comprising:
 telephone line power means in said base unit for conducting power from said telephone line through said hook switch to supply power to said base unit circuits whenever said hook switch is closed;
 base unit battery and regulator means for supplying power to said base unit circuits whenever said hook switch is open;
 base unit power cycling means in said base unit characterized by an on/off duty cycle for periodically interrupting power flow from said base battery means;

base unit security code decoder means connected to said base unit receiver circuits for sensing a predetermined code;

base unit control means in said base unit connected to said base unit radio receiver circuits, said base unit security decoder means and to said ring detector, and responsive to an activation tone, a pilot tone, said base unit decoder means and said ring detector for opening said hook switch in response to said activation tone, closing and maintaining said hook switch closed in response to said predetermined code being received by said decoder means and said pilot tone and stopping said base power cycling means so that said battery and regulator means furnishes uninterrupted power to said base circuits in response to any one of said activation tone, said code being received by said decoder means, said pilot tone and said ring detector; and remote unit control means including oscillator means and encoder means in said remote unit connected to said handset on/off hook sensor and to said remote unit radio transmitter circuits for generating (a) said activation tone for a limited time, (b) said predetermined security code and (c) said pilot tone, in response to said handset being taken off hook, and for generating said activation tone for a limited time and stopping said pilot tone in response to said handset being placed back on hook.

21. The portable telephone system of claim 20 further comprising:

security encoder means in said base unit connected to said base unit transmitter circuits and said ring detector for generating a security code in response to said ring detector;

a ring tone generator connected to said base unit ring detector and to said base unit transmitter circuits for generating a ring tone in response to a ring detected bY said ring detector:

remote unit battery and regulator means in said remote unit for supplying power to said remote unit circuits;

remote unit power cycling means in said remote unit for periodically interrupting power from said remote battery means; and remote unit power cycling control means connected to said remote unit radio receiver circuits, and said remote power cycling means, said remote unit power cycling control means comprising a decoder for sensing said security code and a ring tone detector for sensing said ring tone, said remote unit power cycling control means for stopping said remote power cycling means so that said remote battery means furnishes uninterrupted power to said remote unit circuits in response to either said ring tone, said security code or said handset being off hook.

22. The portable telephone system of claim 20 wherein said battery means are non-rechargeable.

* * * * *